United States Patent [19]

Hedley

[11] Patent Number: 5,430,488
[45] Date of Patent: Jul. 4, 1995

[54] IMAGE SIGNAL PROCESSING APPARATUS FOR CONVERTING TO FRAME FORMAT RASTERED IMAGE DATA WHICH IS SUPPLIED IN FIELD FORMAT BUT WHICH ORIGINATED IN FRAME FORMAT

[75] Inventor: David J. Hedley, Winchester, England

[73] Assignee: Sony United Kingdom, Ltd., Staines, United Kingdom

[21] Appl. No.: 910,409

[22] Filed: Jul. 8, 1992

[30] Foreign Application Priority Data

Sep. 27, 1991 [GB] United Kingdom ............... 9120624

[51] Int. Cl.⁶ .................................................. H04N 7/01
[52] U.S. Cl. ....................................... 348/446; 348/448
[58] Field of Search ............... 358/140, 11, 141, 12, 358/13, 188, 160, 21 R, 133, 22, 183; 348/446, 448, 718; H04N 7/00, 7/01, 7/04, 11/00, 11/20

[56] References Cited

U.S. PATENT DOCUMENTS

| | | | |
|---|---|---|---|
| 4,364,090 | 12/1982 | Wendland | 358/140 |
| 4,573,080 | 2/1986 | Maze | 358/140 |
| 4,720,744 | 1/1988 | Washi | 358/140 X |
| 4,881,125 | 11/1989 | Krause | |

FOREIGN PATENT DOCUMENTS

| | | | |
|---|---|---|---|
| 0256860 | 2/1988 | European Pat. Off. | |
| 0274993 | 11/1987 | Japan | |
| 0294084 | 11/1988 | Japan | H04N 7/010 |

*Primary Examiner*—James J. Groody
*Assistant Examiner*—David E. Harvey
*Attorney, Agent, or Firm*—William S. Frommer; Alvin Sinderbrand

[57] ABSTRACT

An image signal processing system is described in which image data in an interlaced format is converted to full frame format prior to application of any vertical processing, A swing buffer 40 is employed with Field 0 being written into the even addresses of a DRAM 44 forming one side of the swing buffer under control of an write controller 48. Field 1 is written into the odd addresses, The data in full frame format is read from consecutive addresses in the DRAM 44 into a signal processing engine 62 whilst the next frame is being written into the DRAM 46 forming the other arm of the swing buffer 40. This arrangement allows data that was captured in full frame format to be vertically processed in full frame format thereby preserving its vertical resolution. The full frame image data was converted out of full frame format prior to receipt by the image processing system for compatibility with hardware developed for interlaced format data.

10 Claims, 7 Drawing Sheets

IMAGE SIGNAL PROCESSING APPARATUS FOR CONVERTING TO FRAME FORMAT RASTERED IMAGE DATA WHICH IS SUPPLIED IN FIELD FORMAT BUT WHICH ORIGINATED IN FRAME FORMAT

BACKGROUND Of THE INVENTION

1. Field of the Invention

This invention relates to image signal processing. More particularly, this invention relates to image signal processing of image data generated or captured in a frame format and then converted to an interlaced format prior to receipt by a signal processing apparatus.

2. Description of the Prior Art

It is known to provide image signal processing systems, such as digital video effects systems, for manipulating video images. Such systems are well developed and can provide a large range of sophisticated effects. It has been proposed to adapt these video systems so that they are also able to operate with film images. This would enable integration of film and high definition video images and so provide access to the sophisticated effects of the video image systems for film images without having to employ new hardware.

An obstacle to such integration of film and video is that film images are typically captured in a full frame format, whilst video images are captured in an interlaced format. The existing image processing hardware has been developed to handle interlaced format video data father than full frame format data. To overcome this it is possible to convert the full frame format data to interlaced format prior to passing it to the existing image processing hardware. It will be appreciated that the data rate of 60 Hz 2:1 interlaced format data and 30 Hz 1:1 full frame format data are the same for a given array of pixels. Accordingly, this format conversion appears to provide a simple and effective way of integrating video and film.

However, there is a problem with this simple approach. For a fixed data sample rate, full frame format provides greater vertical spatial resolution at the cost of less temporal resolution, whereas interlaced format provides greater temporal resolution at the cost of less vertical spatial resolution. If one simply transforms image data captured in full frame format to interlaced format you don't gain the improved temporal resolution and yet you lose potential spatial resolution through not being supplied with a sequence of adjacent full frame raster lines. As a consequence, any signal processing apparatus using successive lines of image data (e.g. a vertical finite impulse response filter) is only supplied with every other line when using the interlaced format data resulting in a loss of spatial resolution in the signal processing being carried out. An object of the invention is to allow for the integration of full frame and raster image data processing without losing spatial resolution.

SUMMARY OF THE INVENTION

Viewed from one aspect the invention provides an image signal processing apparatus comprising:
 (i) an input memory for receiving rastered image data captured in frame format and converted into interlaced field format;
 (ii) an input memory reader for reading rastered image data in frame format from said input memory; and
 (iii) means for effecting signal processing using successive lines of rastered image data in frame format as read from said input memory to produce processed image data for subsequent frame format display.

The invention recognises that whilst it may be advantageous to transform full frame format image data to an interlaced format to simplify the integration of film and video, there will be a loss in spatial resolution in signal processing using successive lines of the image if the data is not transformed back to full frame format prior to undergoing this signal processing. The invention overcomes the problem by writing the fields of the interlaced data into a memory within the signal processing apparatus from which the full frame format data can be reconstructed by an appropriately ordered reading of the lines of data out of the memory. The subsequent signal processing is then able to make use of the inherently high vertical spatial resolution of the data captured in full frame format.

In view of the high data rates involved in image processing there is a problem in providing hardware fast enough to cope with real time manipulation of the data. In preferred embodiments of the invention said input memory comprises a swing buffer memory. This arrangement allows the storage of the field of one frame to be effected in one of the buffers whilst the full frame data is being reconstructed by appropriately ordered reading from the preceding field of data stored in the other buffer. This introduces a one frame delay in the processing, but allows a full frame period during which the hardware can transform between formats.

An advantageously simple and effective way of carrying out the appropriately ordered reading is to provide an input address generator for controlling addressing of said input memory, said input address generator having its least significant bit set to a first value during reception of a first field of said rastered image data in interlaced field format and set to a second value during reception of a second field of said rastered image data in interlaced field format.

In some circumstances it will be appropriate to read the full frame format data from the input memory as a full frame block of data. However, since some of the hardware being used may be constrained to handling data in blocks of a size equal to one interlaced field (e.g. tape recorders in which one track corresponds to one field) in preferred embodiments said input memory reader reads said rastered image data in frame format as two halves of a full frame separated by a blanking period.

Whilst the above feature of splitting the full frame data in half can overcome some hardware constraints, it introduces additional problems in itself. The normal blanking periods between fields of interlaced data occur at times corresponding to data at the edges of the image, whereas a blanking period in the middle of the full frame data corresponds to the highly visible centre of the image. In the case of signal processing effects that rely on values from a number of successive lines, there will be some signal processing results that rely on samples spanning the blanking period in the centre of the image. In order to avoid the appearance of any highly visible discontinuities at the centre of the image, embodiments in which said means for effecting signal processing utilises data values from different raster lines held within data value stores, also ensure said data value stores are write disabled during said blanking period.

Thus, sample values are held across the blanking period to preserve continuity in the results.

The signal processing may be for producing effects such as mixing of images or wipes across images, but the invention is particularly advantageous when said means for effecting signal processing includes a vertical filter.

Whilst the invention may be used with a number of different formats it is particularly suitable for situations in which said input memory is operable to receive rastered image data in interlaced field format being rastered image data generated in a rastered 30 Hz frame format and converted prior to reception by said image data processing apparatus into a rastered 60 Hz interlaced video format. The data rates are the same and the interlaced format matches the high definition standard which is of comparable quality to film image.

The conversion between interlaced format for exchange between items of hardware and full frame format for use in the signal processing may also be necessary at the output of the signal processing apparatus. To this end, preferred embodiments of the invention further comprise an output memory for receiving processed image data in frame format from said means for effecting signal processing, and an output memory reader for reading and outputting processed image data in interlaced format from said output memory. It will be understood that if the data was subject to such a conversion back into interlaced format (e.g. in order to be recorded on a video tape recorder designed for interlaced data) then it would have to be put back into frame format again prior to display. Images captured in full frame format should ultimately be displayed in full frame format.

Viewed from another aspect the invention provides an image signal processing method comprising the steps of:

(i) receiving rastered image data captured in frame format and converted into interlaced field format in an input memory;

(ii) reading rastered image data in frame format from said input memory; and (iii) effecting signal processing using successive lines of rastered image data in frame format as read from said input memory to produce processed image data for subsequent frame format display.

The above, and other objects, features and advantages of this invention will be apparent from the following detailed description of illustrative embodiments which is to be read in connection with the accompanying drawings.

DESCRIPTION OF THE PREFERRED EMBODIMENTS

FIGS. 1 to 4 comprise representations of an image at various stages of its processing when using different image capture and image processing formats. These figures illustrate the various strengths and weaknesses of the different approaches for the sake of simplicity, each system is assumed to only have twelve raster scan lines. The image to be processed is a square comprising six horizontal strips of alternating black and white and is moving rapidly leftward relative to the inter-field/interframe time period. The alternating strips forming the square have a high vertical frequency relative to the number of raster lines. Such a rapidly moving image with high vertical frequency is a rather extreme images and should highlight any weaknesses in the processing system employed.

Figure 1:
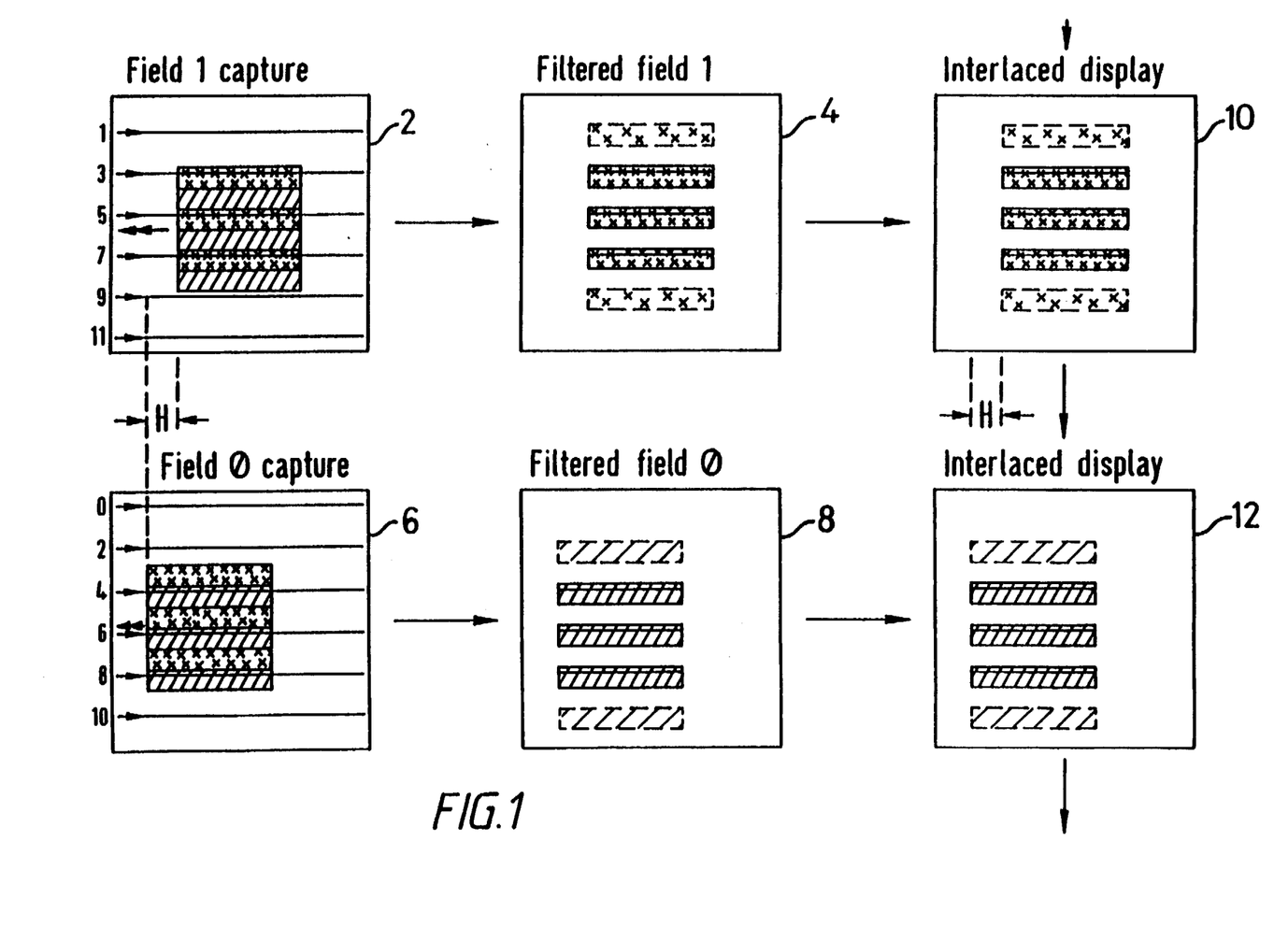
FIG. 1 illustrates a system with interlaced image capture, filtering and display.

Turning now to FIG. 1, stage 2 illustrates image capture of Field 1 comprising raster lines 1, 3, 5, 7, 9 and 11. Raster lines 3, 5 and 7 pick up the white strips of the square (indicated by crosses). Raster lines 1, 9 and 11 are blank. It is assumed that image capture itself is effectively instantaneous.

Field 1 from stage 2 is then subject to vertical filtering to produce the filtered field illustrated at stage 4. For these illustrative examples, the vertical filtering being used is attempting to average over the highest vertical spatial frequencies (these high frequencies can produce spurious effects) and to mix the colour of the horizontal edges of the square into the background colour over an interval of, one paster line. Such a filtering technique could be implemented using a suitable finite impulse response filter with line delay elements in accordance with known techniques. As can be seen, the filtering adds grey strips above and below the three original strips picked out in the image capture. Since Field 1 is composed of only half the lines of the original image, this interline filtering has a relatively low resolution.

Stages 6 and 8 illustrate the same process carried out with Field 0. In this case it is the black strips (represented by diagonal lines) that are picked out in raster lines 4, 6 and 8 of Field 0. The vertical filtering produces grey strips (not necessarily the same grey as for Field 1) above and below the three strips picked out duping image capture.

It will be also seen that at the time that Field 0 is captured, the rapidly moving square has moved a distance H leftwards. This is reflected in the position of the strips in the filtered Field 0. The low inter-field delay produces good tracking of the rapidly moving square. Stages 10 and 12 illustrate successive interlaced displays produced with the filtered fields such as those of stages 4 and 8. The image of stage 10 is composed of the material of filtered Field 1. The leftwards shift by an amount H between successive displayed field can be seen.

It was intended that the vertical filtering should produce averaging and a mixing of the colours at the horizontal edges with the background colour. The high vertical frequency of the image and low vertical resolution of the interlaced format has resulted in a rather poor performance in achieving this result.

Correct averaging has not been possible as only alternate raster lines were fed to the filter. The resulting display will show a pronounced flicker as successive contrasting black and white fields are displayed. With regards to the edge mixing, the vertical resolution is poor with the mixing extending Over two raster lines rather than one raster line.

Whilst the vertical filtering performance of the system shown in FIG. 1 is poor due to the low vertical resolution, a good tracking of the leftwards movement of the square is achieved due to the high temporal resolution. The position of the square displayed moves leftwards by an amount H between each display field and the image is smeared over a distance H.

Figure 2:
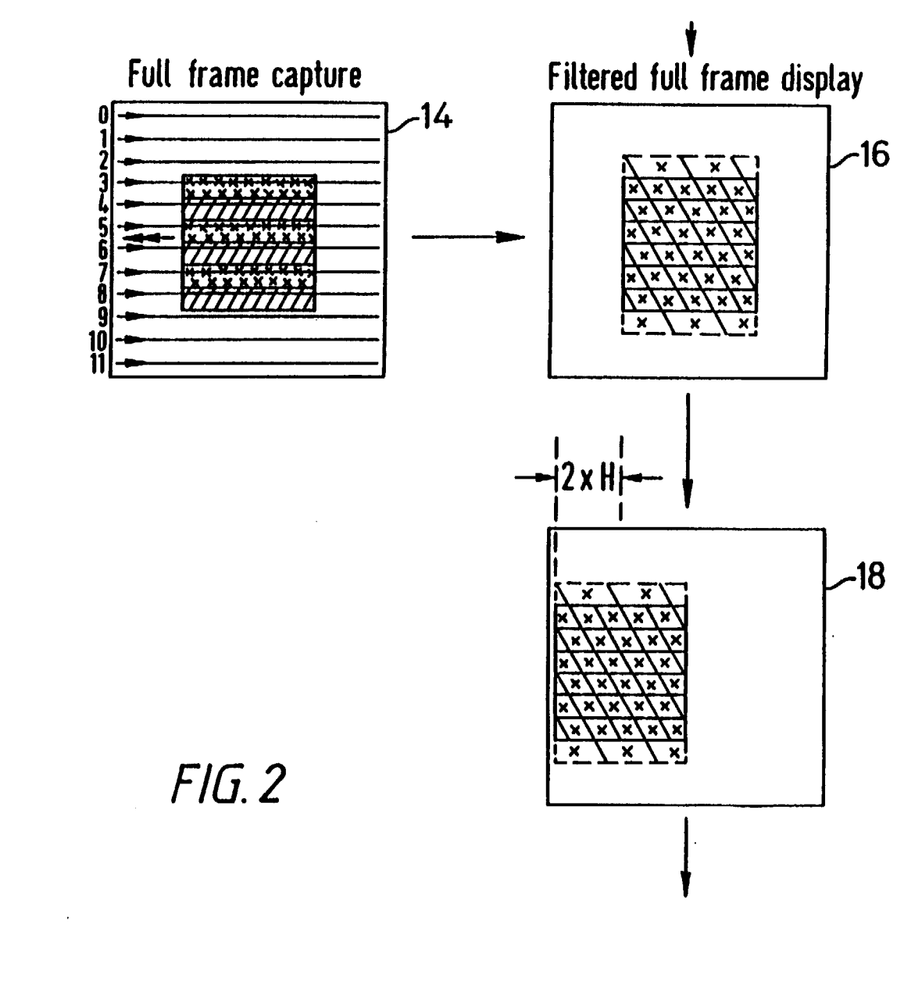
FIG. 2 illustrates a system with full frame image capture, filtering add display.

FIG. 2 illustrates a system operating with full frame capture, filtering and display. In stage 14 the square is raster scanned with twelve raster lines. In order to make a true comparison with the system of FIG. 1, the overall data fate of FIG. 2 is the same as FIG. 1 with the result that a full frame capture occurs once for every two field captures of the system of FIG. 1.

Stages 16 and 18 show the sequence of filtered full frame images that are displayed. Upon vertical filtering, the increased vertical resolution of the full frame capture means that correct averaging over the image is achieved and only a single grey strip is produced at the top and bottom horizontal edges of the square. The increased vertical resolution is however accompanied by a decreased temporal resolution. The leftwards motion of the image between the images of stages 16 and 18 is 2*H resulting in less smooth tracking and a jerkier appearance.

Figure 3:
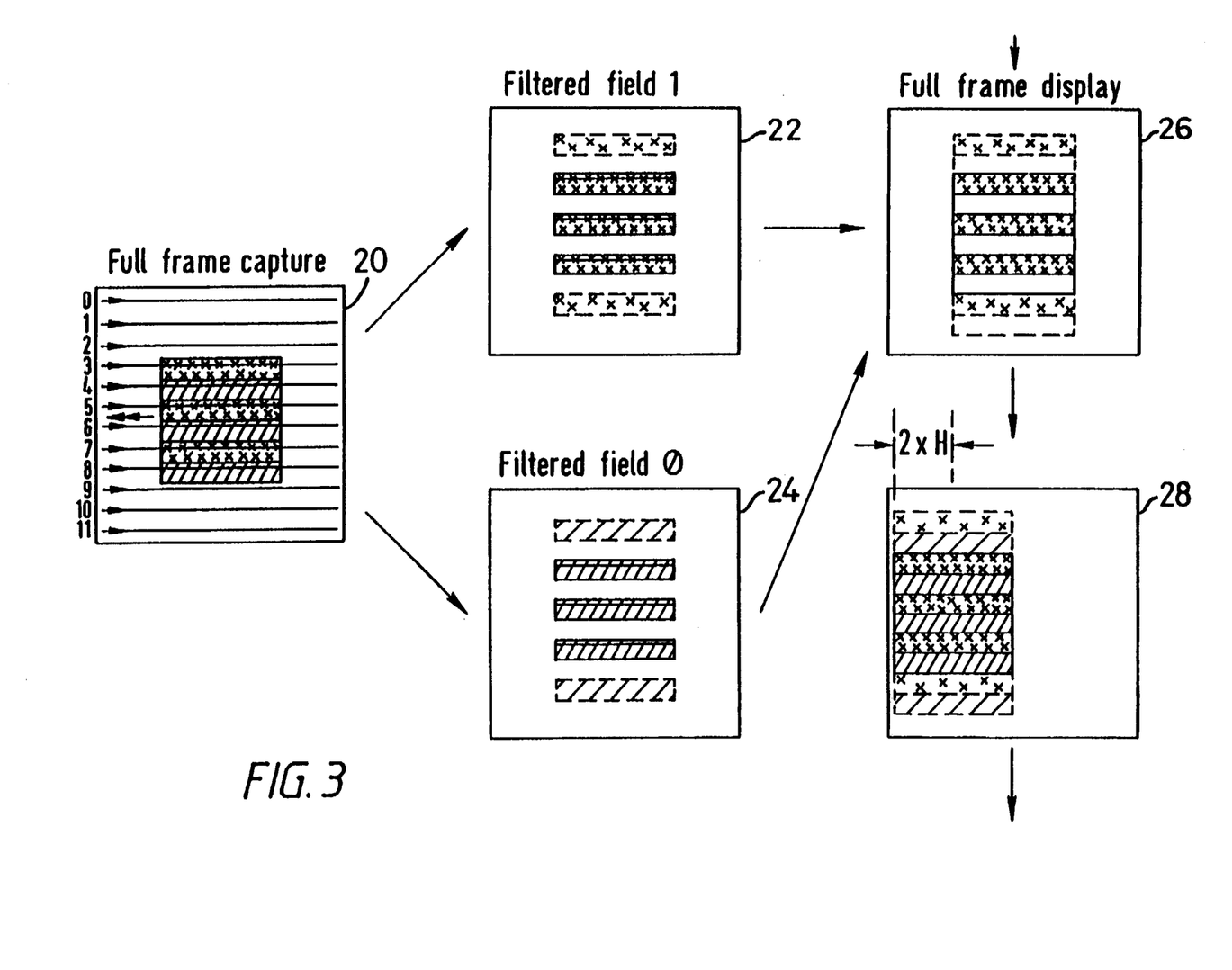
FIG. 3 illustrates a system with full frame capture and interlaced filtering and display.

FIG. 3 illustrates a simple system by which full framed captured image is transformed into interlaced format so that it can be received by and processed using hardware design for interlaced video image. Stage 20 illustrates full frame capture with 12 raster lines as for the system of FIG. 2. This full frame image is then split into two interlaced fields illustrated by stages 22 and 24. Each of these fields has a lower vertical resolution than the full frame image. The two fields of data are then passed in the required format to the signal processing hardware where the vertical filtering is applied.

The lower vertical resolution of each field means that the vertical filtering has the same poor performance as that discussed in relation to the system of FIG. 1. The two interlaced fields ape then combined to form a full frame display. A sequence of full frame displayed images is illustrated in stages 26 and 28. Since the capture occurred on a full frame basis there is a relatively low temporal resolution in the field data and this manifests itself in the full frame images that are displayed. Thus, each set of strips moves by a distance of 2*H between displayed images.

The system of FIG. 3 can be considered to be a hybrid of the systems of FIGS. 1 and 2 intended provide integration of data captured in the full frame format with hardware designed for interlaced format. Unfortunately the hybrid system of FIG. 3 inherits the worst aspects of each of the systems of FIGS. 1 and 2, i.e. it suffers from both poor vertical filter performance and poor temporal resolution.

Figure 4:
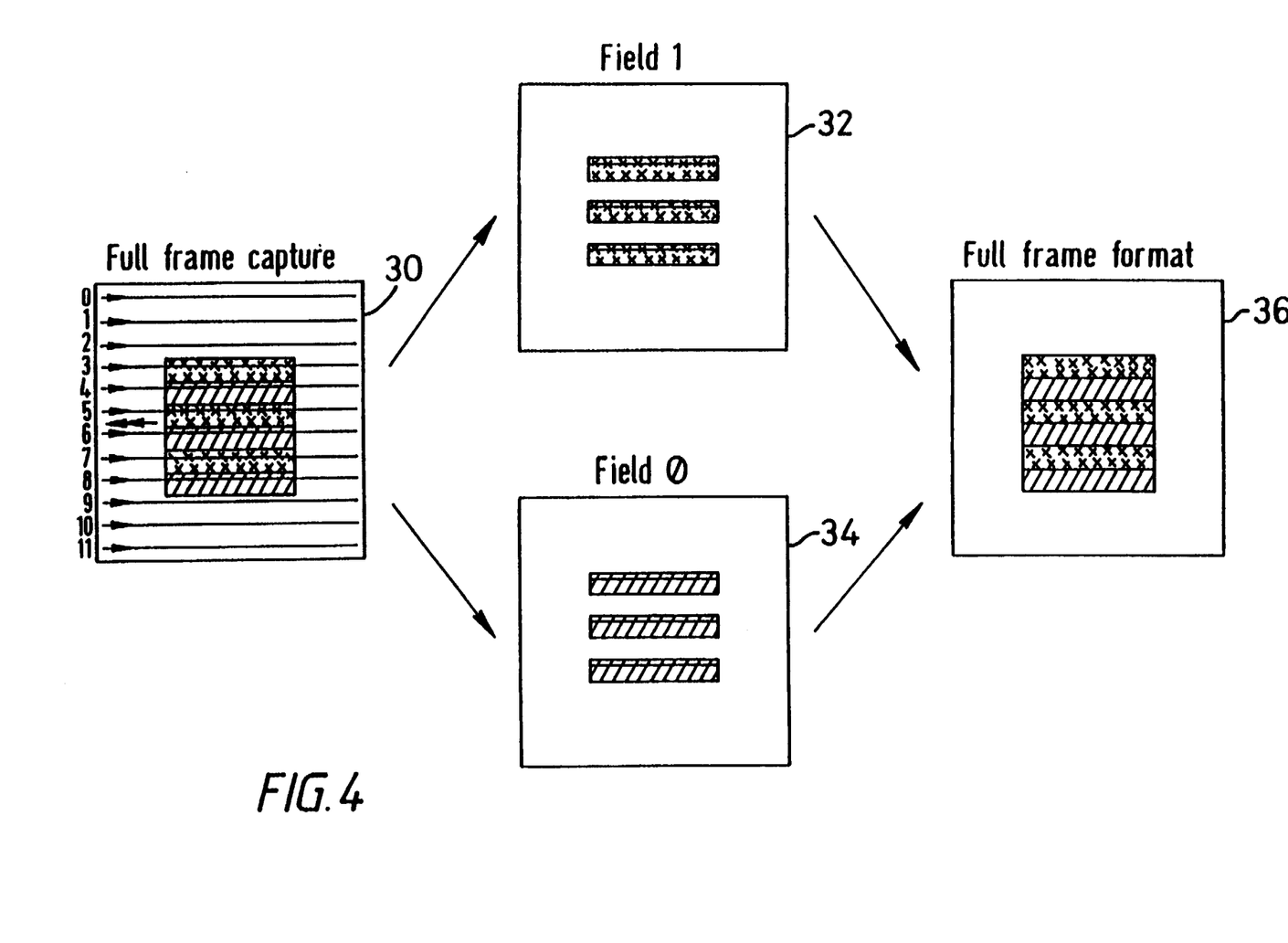
FIG. 4 illustrates a change in image data format from full frame format to interlaced format and from interlaced format back to full frame format.

FIG. 4 illustrates the format conversion which forms part of the present invention. Stage 30 illustrates a full frame image capture. This full frame image is then split into two interlaced fields shown in stages 32 and 34. By splitting the image into interlaced format use can be made of the existing video processing hardware which is set up to receive image data in this format. However, as described earlier, by splitting the full frame image into an interlaced format a loss in potential vertical resolution has occurred. In order to reverse this loss, the image is reassembled into full frame format illustrated in stage 36 prior to undergoing any signal processing in the vertical direction. Thus, the loss in vertical resolution that occurs when transforming between full frame and interlaced formats for the proposes of integration has been recognised and overcome by reassembling the data into full frame format prior to processing.

Figure 5:
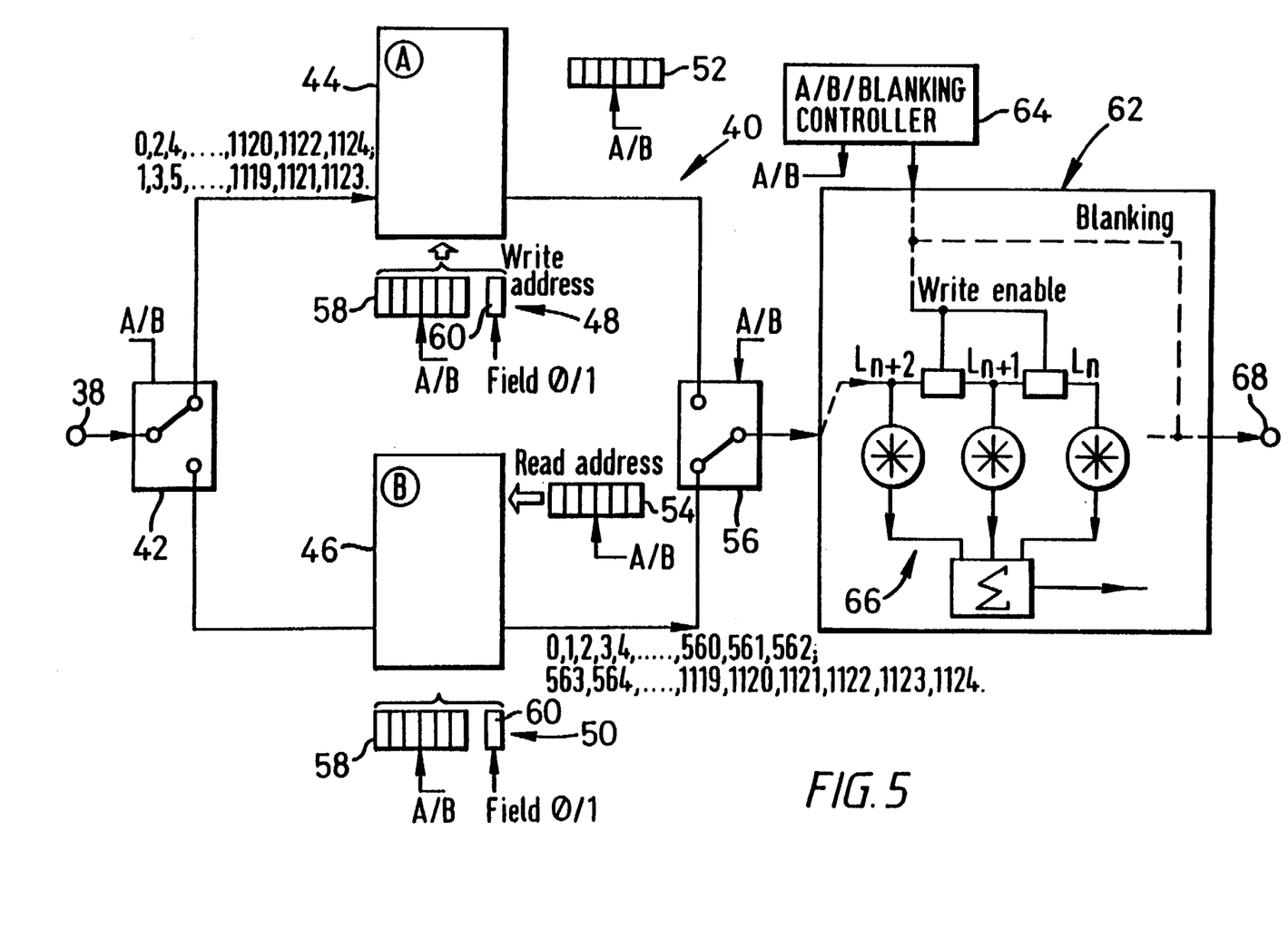
FIG. 5 illustrates a system for effecting format transformation and carrying out vertical filtering.

FIG. 5 illustrates a signal processing apparatus. Interlaced image data is applied to input node 38 from where it is switched to one of the sides A or B of the swing buffer arrangement 40 by the switch 42 acting under control of a signal A/B. The interlaced input data was originally captured in 30 Hz full frame format and then converted to 60 Hz interlaced format for the purpose of passing it into the signal processing hardware. The A/B signal switches at the frame rate. Essentially the same hardware could be used for data captured in interlaced format by switching the A/B signal at the field rate and writing the data into consecutive lines addresses 0, 1, 2, 3, . . . .

Each side of the swing buffer arrangement 40 includes a dynamic random access memory (DRAM) 44, 46 (this is made up of a plurality of separate DRAM chips). Writing to each DRAM 44, 46 is controlled by a write controller 48, 50 (input address generator). Reading from each DRAM 44, 46 is controlled by a read controller 52, 54. The outputs from each of the DRAMs 44, 46 are selected in sequence by a switch 56 under control of the signal A/B.

Each write controller 48,50 comprises an address generator 58 and a latch 60. The latch 60 holds a value of either 0 or 1 depending upon whether Field 0 or Field 1 of the interlaced data is currently being applied to the input node 38. The address generator 58 may be a binary counter. The value held in the latch 60 forms the least significant bit of the write address applied to each of the DRAMs 44, 46 by the write controllers 48, 50.

When Field 0 is being applied to input node 38 the latch holds a value of 0 and the write controller 48, 50 counts through all the even binary numbers. Accordingly, all of the even numbered raster lines are stored in the even numbered address locations within the DRAMs 44, 46. Similarly, when Field 1 is being applied at input node 38 the write controller 48, 50 counts through all the odd address values.

In this way, as the interlaced format data is written into the DRAMS 44, 46 it is reassembled back into a full frame format. The data is read from the DRAMs 44, 46 under the control of the read controllers 52, 54 which count normally through all the addresses within the DRAMs to read the data in full frame format.

In the point of the operation cycle illustrated in FIG. 5, the interlaced format is being fed to the DRAM 44 by the switch 42 where it is being written into the DRAM under control of the write controller 48. At the same time, full format data is being read out of the DRAM 46 under control of the read controller 54 and passed onto the signal processing engine 62 via the switch 56. The state of the switches 42 and 56 as well as the currently activated one of the write controller and read controller for each DRAM is selected in accordance with the signal A/B.

The signal A/B is generated by a unit 64 and switches state at the overall frame rate. The unit 64 also generates signals which control the blanking periods inserted in the reformatted data and any necessary write enable signals for use within the signal processing engine 62.

The signal processing engine 62 is illustrated as including a typical finite impulse response filter 66. In this case, the filter is a three tap vertical filter with an inter-tap delay equal to the interline period. Samples from the same vertical point within successive raster lines are multiplied by appropriate weighting factors and then summed to produce the filtered output.

As discussed in the introduction, the reformatted data can be punctuated with various blanking periods. These blanking periods can provide functions such as synchronisation. The blanking periods are inserted under control of the unit 64. The blanking can occur on an inter-frame basis or on a intra-frame basis. If blanking takes place on a intra-frame basis then the latches within the delay line of the finite impulse response filter 66 are write disabled during the blanking period to preserve their stored values needed for the calculations representing the first few raster lines following the blanking period. The output from the signal processing engine 62 is fed to an output node It will be appreciated that the signal processing engine 62 has been fed with successive lines of the rastered image data in a full frame format thereby allowing high resolution vertical filtering to take place. The DRAMS 44 and 46 introduce a one frame delay into the processing during which the image data is reformatted from interlaced to full frame form.

Figure 6:
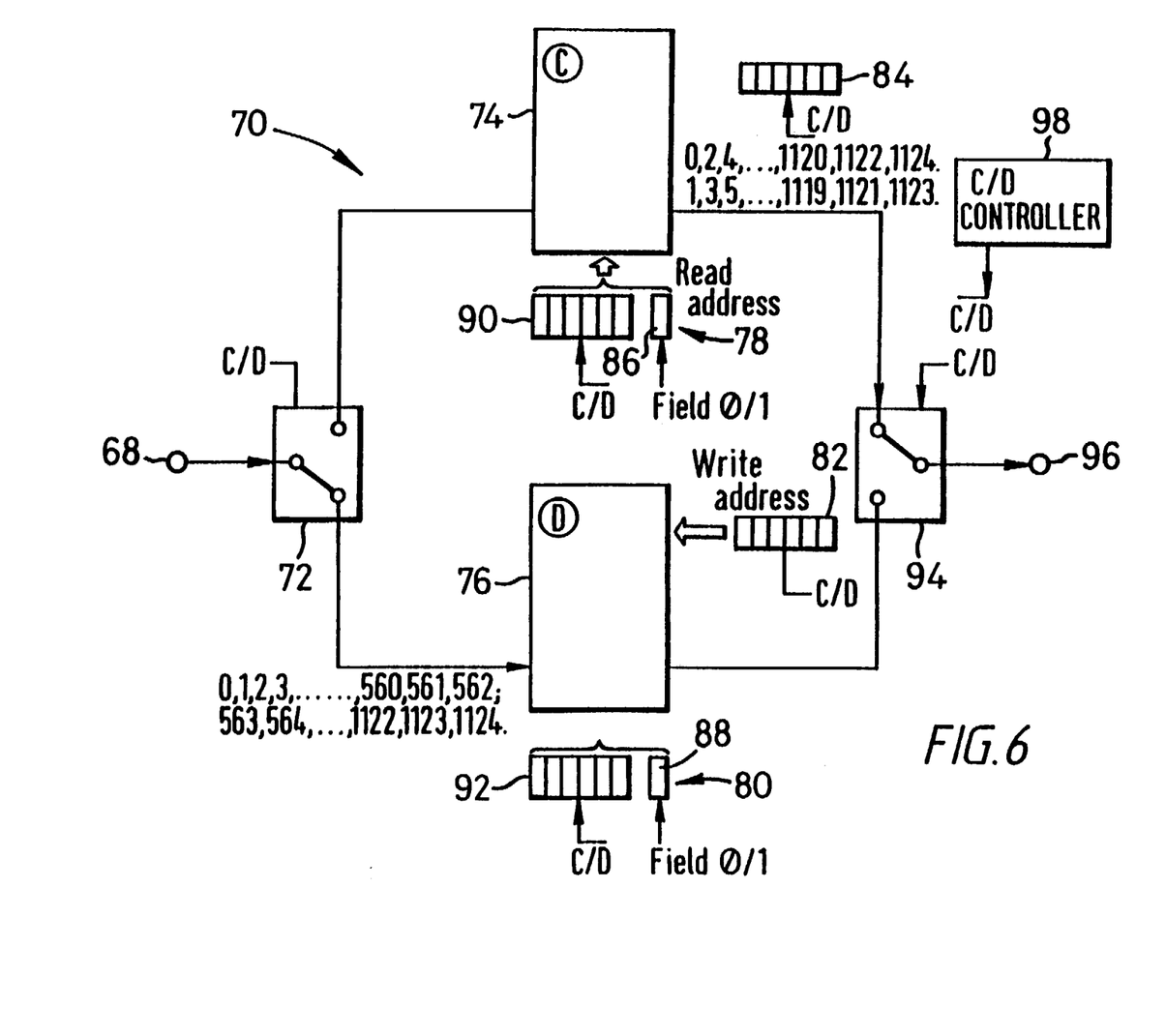
FIG. 6 illustrates a system for transforming format prior to output.

FIG. 6 illustrates an additional circuit that may be used to convert the full frame format data back into interlaced format. The data from the output node 68 is fed into a swing buffer arrangement 70 via a switch 72 under control of a signal C/D. The swing buffer arrangement 70 includes two DRAMS 74 and 76 each having read controllers 78 and 80, and write controllers 82 and 84. The read controllers 78 and 80 (output address generators) comprise latches 86 and 88 operating in conjunction with binary counters 90 and 92 to provide binary read addresses. If Field 0 is being read from the DRAM then the latch 86, 88 will store a value of 0 and the overall sequence of read addresses will comprise the even numbered addresses within the DRAM 74, 76. Similarly, if Field 1 is being read from the DRAM 74, 76 then the latch 86, 88 will store a value of 1 and the overall address produced by the read controller 78, 80 will be a sequence of the odd numbered addresses.

The write controllers 82 and 84 comprise normal binary counters generating all the addresses. The full frame format data is written into the DRAMS 74 and 76 under control of the addresses generated by the write controllers 82 and 84. The data is read out of the DRAMS 74 and 76 under control of the read addresses generated by the read controllers 78 and 80. The output from the DRAM currently being read is selected by a switch 94 and fed to a node 96.

At the point in the sequence of operations illustrated the full format data is being written into the DRAM 76 and interlaced format data is being read out of the DRAM 74. A unit 98 generates the signal C/D which synchronises the operation of the elements within the circuit of FIG. 6.

If the implementation is within a digital video effects system then the video manipulation memory already present in the system can be used to effect the conversion back into interlaced format. When using a digital video effects system with data captured in full frame format, the effects processing would be carried out at frame fate rather than the usual field rate.

Figure 7A:
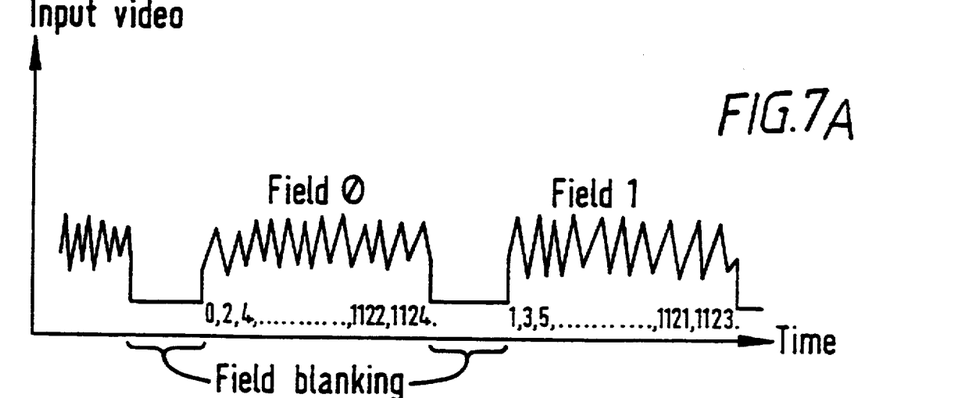
FIG. 7 shows the relationship between interlaced input video signals and various transformed formats with blanking periods.
Figure 7B:
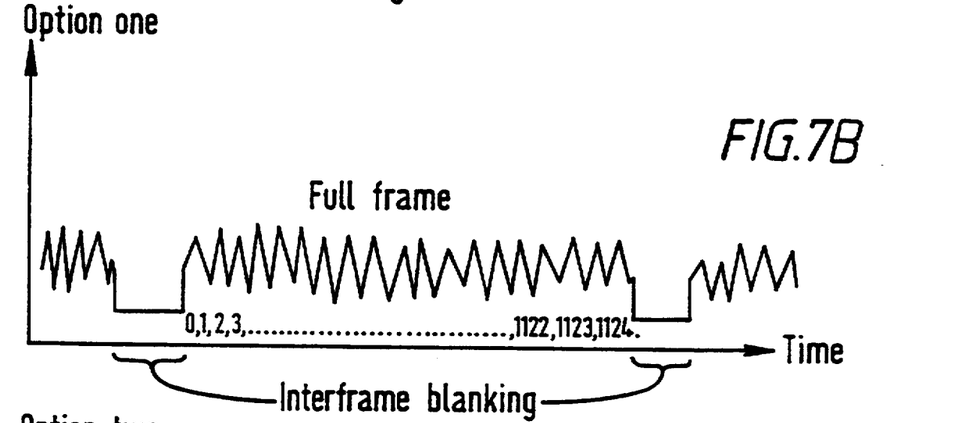
Figure 7C:
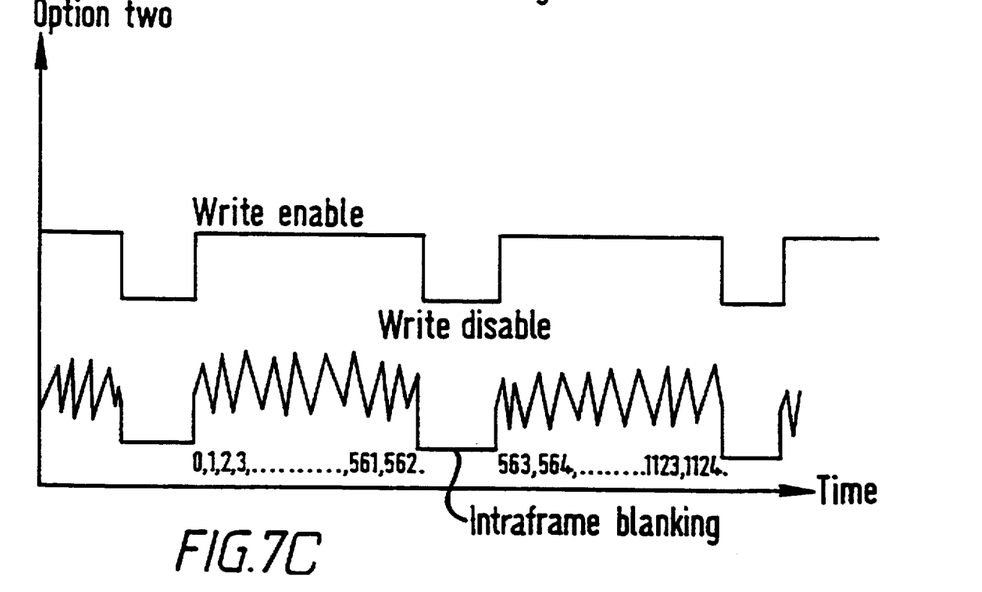

FIG. 7 illustrates the various signal formats. The input video comprises Fields 0 and 1 separated by field blanking periods. Field 0 includes the even numbered raster line data, and Field 1 includes the odd numbered raster line data.

Option 1 illustrates an output format in which full frames of data are separated by inter-frame blanking periods. Option 2 illustrates the output format of the circuit of FIG. 5 in which the full frame data includes intra-frame blanking periods. The level of the write enable signal is also shown. The write enable signal ensures that the latches within the finite impulse response filter 66 hold their values during the frame blanking period. The first part of the frame includes the upper raster lines 0 to 562 (high definition format) and the second part of the frame holds lines 563 to 1124.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An image signal processing apparatus for receiving rastered image data supplied thereto in interlaced field format, said rastered image data being of the type that is generated in frame format and then converted into interlaced field format, said apparatus comprising
   an input memory, for receiving and storing the supplied rastered image data;
   an input address generator for controlling addressing of said input memory, said input address generator generating memory addresses at which the received rastered image data is stored and having its least significant bit set to a first value throughout reception of a first field of said received rastered image data and set to a second value throughout reception of a second field of said received rastered image data;
   an input memory reader for reading out the stored rastered image data in frame format from said input memory; and
   means for effecting signal processing using successive lines of rastered image data in frame format as read from said input memory to produce processed image data for subsequent frame format display.

2. An image signal processing apparatus as claimed in claim 1, wherein said input memory comprises a swing buffer memory.

3. An image signal processing apparatus as claimed in claim 1, said means for effecting signal processing comprising a digital video effects system operable for processing rastered image data at frame rate and field rate.

4. An image signal processing apparatus for receiving rastered image data supplied thereto in interlaced field format, said rastered image data being of the type that is generated in frame format and then converted into interlaced field format, said apparatus comprising:
   an input memory for receiving and storing the supplied rastered image data;
   an input memory reader for reading out from said input memory said rastered image data in frame format as two halves of a full frame separated by a blanking period; and
   means for effecting signal processing using successive lines of rastered image data in frame format as read from said input memory to produce processed image data for subsequent frame format display.

5. An image signal processing apparatus as claimed in claim 4, wherein said means for effecting signal processing utilises data values from different raster lines held within data value stores, and said data value stores are write disabled during said blanking period.

6. An image signal processing system as claimed in claim 5, wherein said means for effecting signal processing includes a vertical filter.

7. An image data processing apparatus as claimed in claim 4, in which said input memory is operable to receive rastered image data in interlaced field format being rastered image data generated in a rastered 30 Hz frame format and converted prior to reception by said image data processing apparatus into a rastered 60 Hz interlaced video format.

8. An image data processing apparatus for receiving rastered image data supplied thereto in interlaced field format, said rastered image data being of the type that is generated in frame format and then converted into interlaced field format, said apparatus comprising:

an input memory for receiving and storing the supplied rastered image data, an input memory reader for reading out the stored rastered image data in frame format from said input memory, means for effecting signal processing using successive lines of rastered image data in frame format as read from said input memory to produce processed image data for subsequent frame format display, an output memory for receiving the processed image data in frame format from said means for effecting signal processing, and an output memory reader for reading and outputting processed image data in interlaced format from said output memory.

9. An image signal processing apparatus as claimed in claim 8, wherein said output memory comprises a swing buffer memory.

10. An image signal processing apparatus as claimed in claim 8, further comprising an output address generator for controlling addressing of said output memory, said output address generator having its least significant bit set to a first value during reading of a first field of said processed image data in interlaced field format from said output memory and set to a second value during reading of a second field of said processed image data in interlaced field format from said output memory.

* * * * *